Nov. 25, 1958  R. E. BECKER  2,861,585
HYDRAULIC RELIEF VALVE
Filed April 19, 1954  2 Sheets-Sheet 1
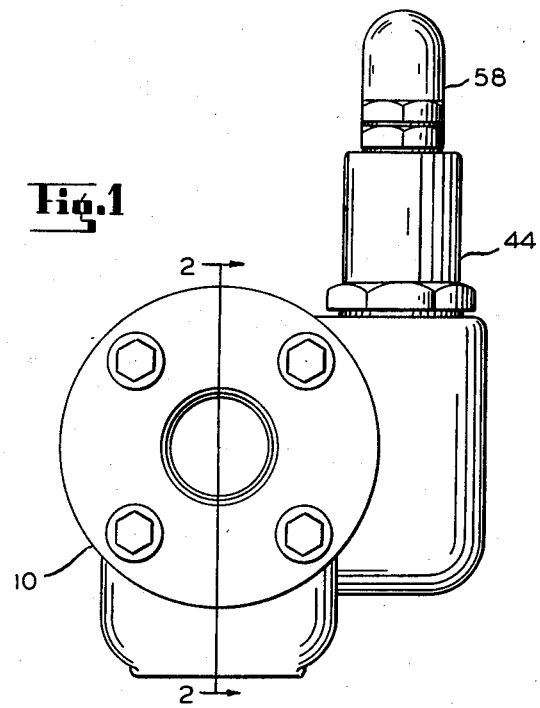
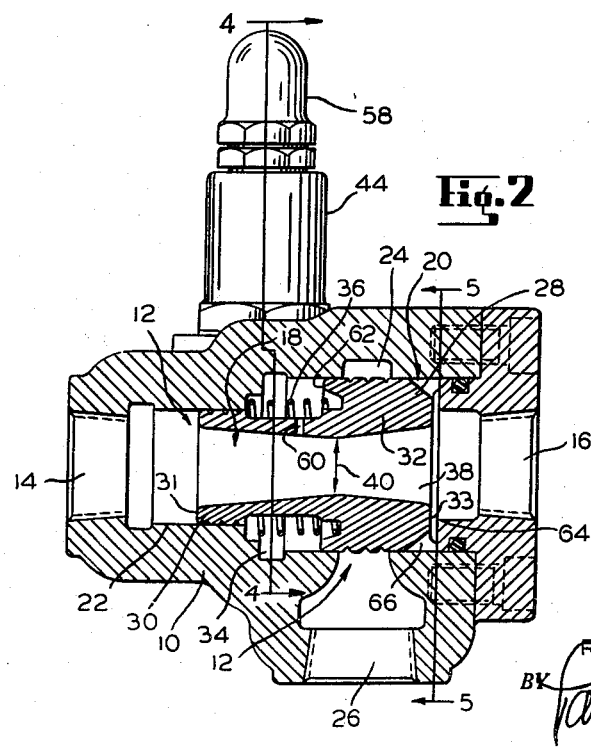
INVENTOR.
ROBERT E. BECKER
BY
ATTORNEYS Nov. 25, 1958  R. E. BECKER  2,861,585
HYDRAULIC RELIEF VALVE
Filed April 19, 1954  2 Sheets-Sheet 2

INVENTOR.
ROBERT E. BECKER
BY
ATTORNEYS

United States Patent Office 2,861,585
Patented Nov. 25, 1958

2,861,585

HYDRAULIC RELIEF VALVE

Robert E. Becker, Logansport, Ind., assignor to Logansport Machine Company, Logansport, Ind., a corporation of Indiana Application April 19, 1954, Serial No. 424,109

12 Claims. (Cl. 137—115)

This invention resides in the field of relief valves and is a new and improved relief valve unit designed to be quickly and easily inserted into a hydraulic line of any type and adapted to relieve or discharge the fluid therein at a predetermined pressure.

A primary object of my invention is a new and improved relief valve which can be adjusted manually so as to open or relieve the pressure in a hydraulic line at any desired pressure and changed as desired.

Another object of my invention is a valve of the above type which can be easily adjusted without special tools.

Another object of my invention is a relief valve of the above type which requires a simple adjustment to select any desired pressure within the entire range of the relief valve's capacity.

Another object of my invention is a valve of the above type which provides substantially unobstructed flow.

Another object of my invention is a valve of the above type constructed to eliminate all chatter during the valve's opening and closing action.

Another object of my invention is a relief valve constructed to maintain a constant head pressure against its pumping unit so as to eliminate any shock or pressure wave due to closing of the relief valve.

Another object of my invention is a relief valve of the above type which is constructed to provide a full relief or exhaust capacity flow for the hydraulic system with which it is used.

Other objects will appear from time to time in the ensuing specification and drawings in which:

Figure 1 is an end view of my relief valve unit;

Figure 2 is a sectional view taken along line 2—2 of Figure 1;

Figure 3:
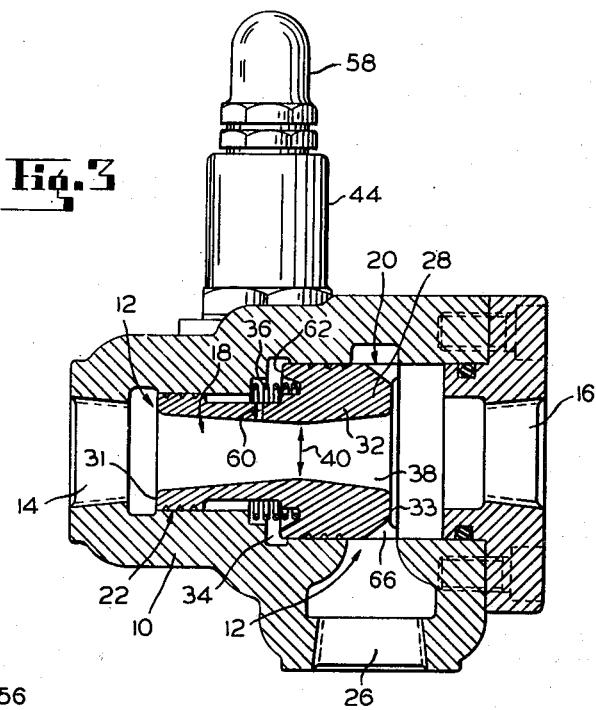
Figure 3 is a view similar to Figure 2 showing the relief valve open.

In Figure 2 I have shown a valve body 10 having a central fluid passage indicated generally at 12. The passage has an inlet opening 14 and an outlet opening 16 disposed at opposite ends of the passage. Within the valve body is a main valve chamber 18 having a portion 20 with a large diameter and another portion 22 with a small diameter.

The large diametered portion has an annular passage 24 terminating in a relief port 26.

The relief passage is controlled by a piston valve 28 slideably mounted in the main valve chamber having a small piston portion 30 with a face 31 in the small portion 22 of the chamber and a large piston portion 32 with a face 33 in the large chamber portion. The piston defines a bypass chamber 34 with the main chamber and a coil spring 36 biases the piston valve toward its closed position. The piston has a central bore 38 with a venturi 40 to allow fluid flow through the valve.

Figure 4:
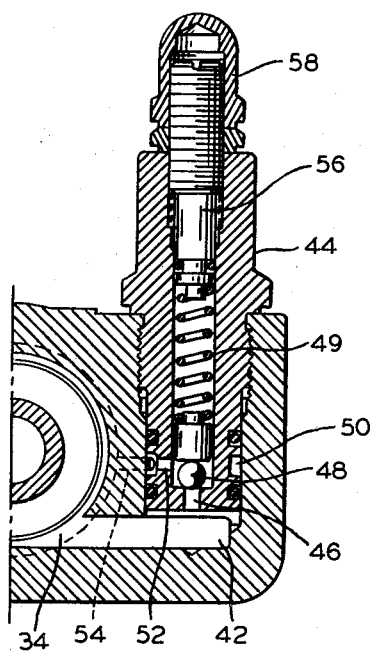
Figure 4 is a sectional view taken along line 4—4 of Figure 2.

As shown in Figure 4, a passage 42 communicates with the relief chamber 34 and is controlled by a check valve unit 44 which includes a valve port 46 closed by a check ball 48 biased by the spring 49. When fluid flows past the check valve, it passes through an opening 52 into an annular passage 50 and from the annular passage to the relief passage 12 by a port 54. A manually adjustable screw 56 varies the bias of the spring so that the pressure required to operate the check valve can be varied. The screw is covered by any suitable cap mechanism 58.

An orifice 60 in the piston valve provides for the entrance of fluid into the bypass chamber 34, and the pressure of the fluid is exerted against an annular shoulder 62 on the piston valve.

Figure 5:
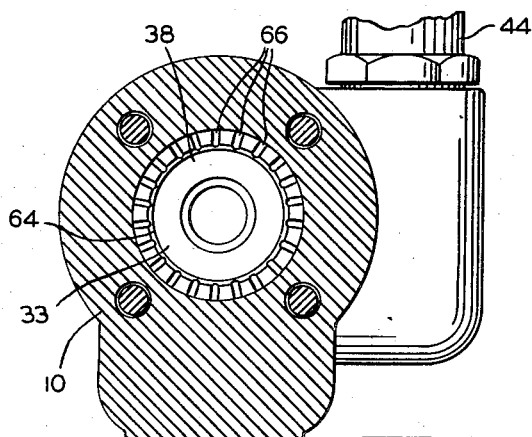
Figure 5 is a sectional view taken along line 5—5 of Figure 2.

In Figure 5, I have shown the large area or face 33 of the piston valve. This face of the valve is countersunk as at 64 and is provided with a plurality of radial slots 66 so that, when the valve is in its open position, the full hydraulic flow will be permitted to the relief passage and port.

The use, operation and function of my invention are as follows:

Hydraulic fluid from the system enters the inlet port 14, flows through the venturied bore 38 of the piston valve, and leaves through the outlet port 16. The pressure of the fluid engages the face 31 of the piston valve and tends to bias it closed. The large diametered piston portion blocks the relief port 26, and fluid flows through the orifice 60 in the piston valve and fills the bypass chamber 34. Therefore, the pressure of the fluid flowing past the opening in the piston valve will bear against the shoulder 62 of the piston valve and this pressure also will tend to bias the valve closed. The spring 36, also biases the valve toward its closed position. The pressure of the fluid also acts on the slotted face 33 on the outlet side of the piston valve and tends to open it or move it toward the inlet port. The total areas acted upon by the pressure of the fluid during normal operation will be generally equal, and the spring constitutes an unbalancing force which maintains the piston valve closed.

The pressure of the fluid in the bypass chamber is communicated to the check valve in Figure 4 through the passage 42. When the pressure in the bypass chamber builds up to a point where it overcomes the check valve, the ball will rise off of its seat and fluid will flow through the port 52, the chamber 50, and out to the relief passage through the port 54. This relieves the pressure behind the piston shoulder in the bypass chamber. Therefore, the pressure on the large face 33 of the piston is greater than the combined pressure of the fluid on the small face and the shoulder in the bypass chamber plus the spring, and the piston valve will move to the open position shown in Figure 3. The radial slots in the large face of the piston allow a full fluid flow to the relief passage. Thus, the excess hydraulic fluid in the system due to the excessive pressure is permitted to discharge back to the reservoir and this relieves the pressure in the system.

At the end of a relief cycle, the pressure in the system will be restored or reduced to a point so that the bypass check valve can close and will maintain it closed. The pressure in the bypass chamber will again build up to equal the pressure of the fluid flowing through the piston valve and the fluid pressures acting on the piston will again generally equal each other so that the spring can close the piston valve. Thus the relief passage is again closed and the hydraulic system will resume its normal flow, and at the same time fluid pressure will again build up in the bypass chamber preparatory for the next relief cycle.

It can be seen that this type of valve requires only one adjusting spring mechanism, as shown in Figure 4, to acquire an entire range of pressures for the relief valve's capacity. At no time is the flow through the valve obstructed, rather it is only diverted to the relief passage when the piston valve is open. At the same time, when the piston valve is open, the full capacity of the hydraulic system can flow out through the relief port. The presence of the venturi in the relief valve increases the flow to the system and the momentary delay that normally occurs between the period of maximum flow to the relief port and the return to the normal system flow is eliminated. It will also be realized that this type of relief valve structure will not chatter or vibrate at any time. The valve also maintains a constant upstream pressure ahead of the venturi during normal operation. This constant head is applied against the pumping unit which is a part of the normal hydraulic system and no shock or pressure wave is inflicted on the pumping unit due to the closing and opening of the relief port.

While I have shown and described the preferred form of my invention, it should be understood that numerous changes, substitutions, alterations and modifications can be made without departing from the invention's fundamental theme, and I wish that my invention be unrestricted except as by the appended claims.

I claim:

1. A pressure relief valve having a valve body with a main fluid passage, inlet and outlet ports for the main passage, a relief passage communicating with the main passage, a valve piston slidably disposed in the main passage controlling the relief passage and movable between an open and a closed position, a central passage through the valve piston to provide fluid flow from the inlet to the outlet, a venturi in the central passage of the valve piston, and a bypass to the relief passage communicating with the central passage ahead of the throat of the venturi toward the inlet of the main passage.

2. The structure of claim 1 further characterized by and including valve means in the bypass normally closed and constructed to open in response to a predetermined pressure.

3. In a pressure relief valve, a valve body with a main fluid passage having inlet and outlet ports, a main chamber in the passage having at least two diameters, a relief passage in communication with the fluid passage, a longitudinally slidable piston valve in the chamber having correspondingly diametered piston portions defining an inlet chamber, an outlet chamber, and a bypass chamber with the main chamber, the piston valve being spring biased so that it normally closes the relief passage, a central passage through the piston valve to provide for fluid flow through the main fluid passage, a bypass passage communicating with the main passage and the bypass chamber, and valve means normally closing the bypass passage and adapted to open at a predetermined pressure so as to relieve the pressure in the bypass chamber and cause the piston valve to uncover the relief passage.

4. The structure of claim 3 in which the piston valve's central passage has a venturi.

5. The structure of claim 4 in which the bypass chamber communicates with the venturi.

6. The structure of claim 5 in which the bypass chamber communicates with the venturi.

7. The structure of claim 5 characterized by and including manually operable means associated with the valve means for the bypass so as to vary the pressure at which it opens.

8. In a pressure relief valve, a valve body with a main fluid passage having inlet and outlet ports, a main chamber in the passage having generally two diameters, a relief passage in communication with the fluid passage, a longitudinally slidable piston valve in the chamber having correspondingly diametered piston portions defining with the main chamber an upstream inlet chamber, a downstream outlet chamber, and a bypass chamber generally between them, the inlet chamber being smaller in diameter than the outlet and bypass chambers, the piston valve being spring biased toward the outlet port so that it normally closes the relief passage, a central passage through the piston valve to provide for fluid flow through the main fluid passage, an orifice between the main passage and the bypass chamber, a bypass passage between the bypass chamber and the relief passage, and valve means normally closing the bypass passage and adapted to open at a predetermined pressure so as to relieve the pressure in the bypass chamber and cause the piston valve to uncover the relief passage.

9. The structure of claim 8 in which the bypass chamber and outlet chamber have generally the same diameter while the inlet chamber has a reduced diameter.

10. The structure of claim 8 in which the piston valve's central passage has a venturi.

11. The structure of claim 10 in which the orifice communicates with the venturi.

12. The structure of claim 8 characterized by and including manually operable means associated with the valve means for the bypass passage so as to vary the pressure at which it opens.

References Cited in the file of this patent

UNITED STATES PATENTS

| | | |
|---|---|---|
| 231,214 | Curtis | Aug. 17, 1880 |
| 2,188,463 | Mercier | Jan. 30, 1940 |
| 2,556,829 | Teague | June 12, 1951 |
| 2,639,103 | Ball | May 19, 1953 |

FOREIGN PATENTS

| | | |
|---|---|---|
| 339,836 | Great Britain | Dec. 18, 1930 |